(12) United States Patent
Aoyagi

(10) Patent No.: US 8,447,271 B2
(45) Date of Patent: May 21, 2013

(54) MOBILE COMMUNICATION SYSTEM, NETWORK DEVICE AND MOBILE COMMUNICATION METHOD

(75) Inventor: Kenichiro Aoyagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/518,132

(22) PCT Filed: Dec. 21, 2010

(86) PCT No.: PCT/JP2010/073027
§ 371 (c)(1),
(2), (4) Date: Aug. 15, 2012

(87) PCT Pub. No.: WO2011/078180
PCT Pub. Date: Jun. 30, 2011

(65) Prior Publication Data
US 2012/0315870 A1      Dec. 13, 2012

(30) Foreign Application Priority Data

Dec. 21, 2009   (JP) .................................. 2009-289779

(51) Int. Cl.
*H04M 11/00*  (2006.01)
(52) U.S. Cl.
USPC ........ 455/406; 455/405; 455/456.3; 455/411; 705/34
(58) Field of Classification Search
USPC .............. 455/406, 456.3, 405, 411; 370/216, 370/401, 396, 410, 235.1; 704/200, E17.003; 715/716, 234, 700; 379/283, 361, 93.02, 379/88.02; 705/34, 40; 709/219; 713/185
See application file for complete search history.

(56) References Cited

U.S. PATENT DOCUMENTS

| | | | |
|---|---|---|---|
| 8,010,080 B1 * | 8/2011 | Thenthiruperai et al. | ..... 455/406 |
| 8,259,788 B2 * | 9/2012 | Keren et al. | .............. 375/240.01 |
| 2005/0174944 A1 * | 8/2005 | Legault et al. | ............. 370/235.1 |
| 2006/0004643 A1 * | 1/2006 | Stadelmann et al. | ........... 705/34 |

(Continued)

FOREIGN PATENT DOCUMENTS

| | | |
|---|---|---|
| JP | 06-311099 | 11/1994 |
| JP | 2002-077462 | 3/2002 |

(Continued)

OTHER PUBLICATIONS

3GPP TS 36.331 V8.6.0 (Jun. 2009),"3$^{rd}$ Generatation Partnership Project; Technical Specification Group Radio Access Network; Evolved Universal Terrestrial Radio Access (E-UTRA), Radio Reseource Control(RRC); Protocol Specification", (Jun. 2009).

(Continued)

*Primary Examiner* — Mahendra Patel
(74) *Attorney, Agent, or Firm* — Oblon, Spivak, McClelland, Maier & Neustadt, L.L.P.

(57) ABSTRACT

A mobile communication system 100 has a specific cell configured to use a user line. The mobile communication system 100 includes a line determination unit 22 configured to determine whether or not a communication call uses the user line, by using a line identifier configured to identify a user installed a radio base station managing the specific cell, and a calculation unit 24 configured to calculate a reduction fee to be discounted from a usage fee for the communication call using the user line for the user installed a radio base station managing the specific cell.

5 Claims, 5 Drawing Sheets

U.S. PATENT DOCUMENTS

| | | | |
|---|---|---|---|
| 2006/0015576 A1* | 1/2006 | Seo et al. | 709/219 |
| 2006/0116959 A1* | 6/2006 | Uchida et al. | 705/40 |
| 2008/0306828 A1* | 12/2008 | Chao | 705/17 |
| 2009/0061821 A1* | 3/2009 | Chen et al. | 455/411 |
| 2010/0113067 A1* | 5/2010 | Fullam et al. | 455/456.3 |

FOREIGN PATENT DOCUMENTS

| | | |
|---|---|---|
| JP | 2004-015103 | 1/2004 |
| JP | 2004-242176 | 8/2004 |
| JP | 2004-357041 | 12/2004 |

OTHER PUBLICATIONS

International Search Report issued Jan. 25, 2011 in PCT/JP2010/73027 Filed Dec. 21, 2010.

Office Action issued Aug. 14, 2012 in Japanese Patent Application No. 2009-289779 (with English-language translation).

* cited by examiner

| Access Charge bit | LINE Type | USER LINE RATE | CSG ID |
|---|---|---|---|
|  |  |  |  |

MOBILE COMMUNICATION SYSTEM, NETWORK DEVICE AND MOBILE COMMUNICATION METHOD

TECHNICAL FIELD

The present invention relates to a mobile communication system having a specific cell configured to use a user line and also to a network device and a mobile communication method that are used in the mobile communication system.

BACKGROUND ART

A specific cell called a CSG (closed Subscriber Group) cell, a home cell, or a femtocell is known. An access type can be set for the specific cell. The access type is "Closed," "Hybrid," or "Open."

A "Closed" specific cell is configured to allow only to a specific user (UE; User equipment) to be provided with a service. A "Hybrid" specific cell is configured to allow the specific user to perform communications in a higher quality than that performed by other users (non-specific users). An "Open" specific cell is configured to allow all the users to be provided with a service, as in a general macrocell (for example, Patent Document 1).
Prior Art Document
Patent Document
Non-Patent Document 1: 3GPP TS36.331 v8.6.0

SUMMARY OF THE INVENTION

Here, a line (user line which belongs to the user) contracted by the user him/herself, for example, is used as the line for using the specific cell.

In the above described technique, however, there is no framework to identify a user who installed a radio base station managing the specific cell. Thus, a service to discount at least a part of a usage fee for a communication call using the user line cannot be provided.

Thus, the present invention is made to solve the above-described problem, and an objective thereof is to provide a mobile communication system, a network device and a mobile communication method that makes it possible to provide a service to discount at least a part of a usage fee for a communication call using a user line.

A mobile communication system according to the first feature has a specific cell-configured to use a user line. The mobile communication system includes a line determination unit configured to determine whether or not a communication call uses the user line, by using a line identifier configured to identify a user installed a radio base station managing the specific cell, a calculation unit configured to calculate a reduction fee to be discounted from a usage fee for the communication call using the user line for the user installed a radio base station managing the specific cell and a call type determination unit configured to determine whether or not a type of the communication call using the user line or a connection method of the communication call using the user line is a reduction target. The calculation unit calculates a reduction fee to be discounted from a usage fee for the communication call using the user line for the user installed a radio base station managing the specific cell, if the type of the communication call using the user line or the connection method of the communication call using the user line is a reduction target.

In the first feature, the mobile communication system further includes a notification unit configured to notify the user installed a radio base station managing the specific cell of the reduction fee to be discounted for the user installed the radio base station managing the specific cell.

A network device according to the second feature is provided in a mobile communication system having a specific cell configured to use a user line. The network device includes a line determination unit configured to determine by using a line identifier whether or not a communication call uses the user line, the line identifier configured to identify a user installed a radio base station managing the specific cell, a calculation unit configured to calculate a reduction fee to be discounted from a usage fee for the communication call using the user line for the user installed a radio base station managing the specific cell, and a call type determination unit configured to determine whether or not a type of the communication call using the user line or a connection method of the communication call using the user line is a reduction target. The calculation unit calculates a reduction fee to be discounted from a usage fee for the communication call using the user line for the user installed a radio base station managing the specific cell, if the type of the communication call using the user line or the connection method of the communication call using the user line is a reduction target.

A mobile communication method according the third feature is applied to a mobile communication system having a specific cell configured to use a user line. The mobile communication method includes the steps of determining whether or not a communication call uses the user line, by using a line identifier configured to identify a user installed a radio base station managing the specific cell, calculating a reduction fee to be discounted from a usage fee for the communication call using the user line for a user installed a radio base station managing the specific cell, and determining whether or not call type of the communication call using the user line or a connection method of the communication call using the user line is a reduction target. In the calculation step, a reduction fee to be discounted from a usage fee for the communication call using the user line for the user installed a radio base station managing the specific cell is calculated if the type of the communication call using the user line or the connection method of the communication call using the user line is a reduction target.

MODE FOR CARRYING OUT THE INVENTION

Hereinafter, a description will be given of a mobile communication system according to an embodiment of the present invention with reference to the drawings. Note that, in the following description of the drawings, same or similar reference signs denote same or similar elements and portions.

In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other as a matter of course.

[Overview of Embodiment]

The mobile communication system according to the embodiment has a specific cell configured to use a user line. The mobile communication system includes: a line determination unit configured to determine whether or not a communication call uses a user line, by using a line identifier configured to identify a user installed a radio base station managing the specific cell; and a calculation unit configured to calculate a reduction amount to be discounted from a usage fee for the communication call using the user line for the user installed a radio base station managing the specific cell.

In the embodiment, the line identifier is configured to identify a user installed a radio base station managing the specific cell, and the line determination unit determines by using the line identifier whether or not a communication call uses the user line.

Specifically, the user installed the radio base station managing the specific cell can be identified by the line identifier. This enables provision of a service to discount at least a part of a usage fee for the communication call using the user line.

Note that, the specific cell is preferably a cell arranged on a small scale and extensively in the embodiment. The specific cell is preferably a cell managed by an HNB (Home Node B), an HeNB (Home Evolved Node B), a femto BTS or the like.

[First Embodiment]

(Configuration of Mobile Communication System)

Figure 1:
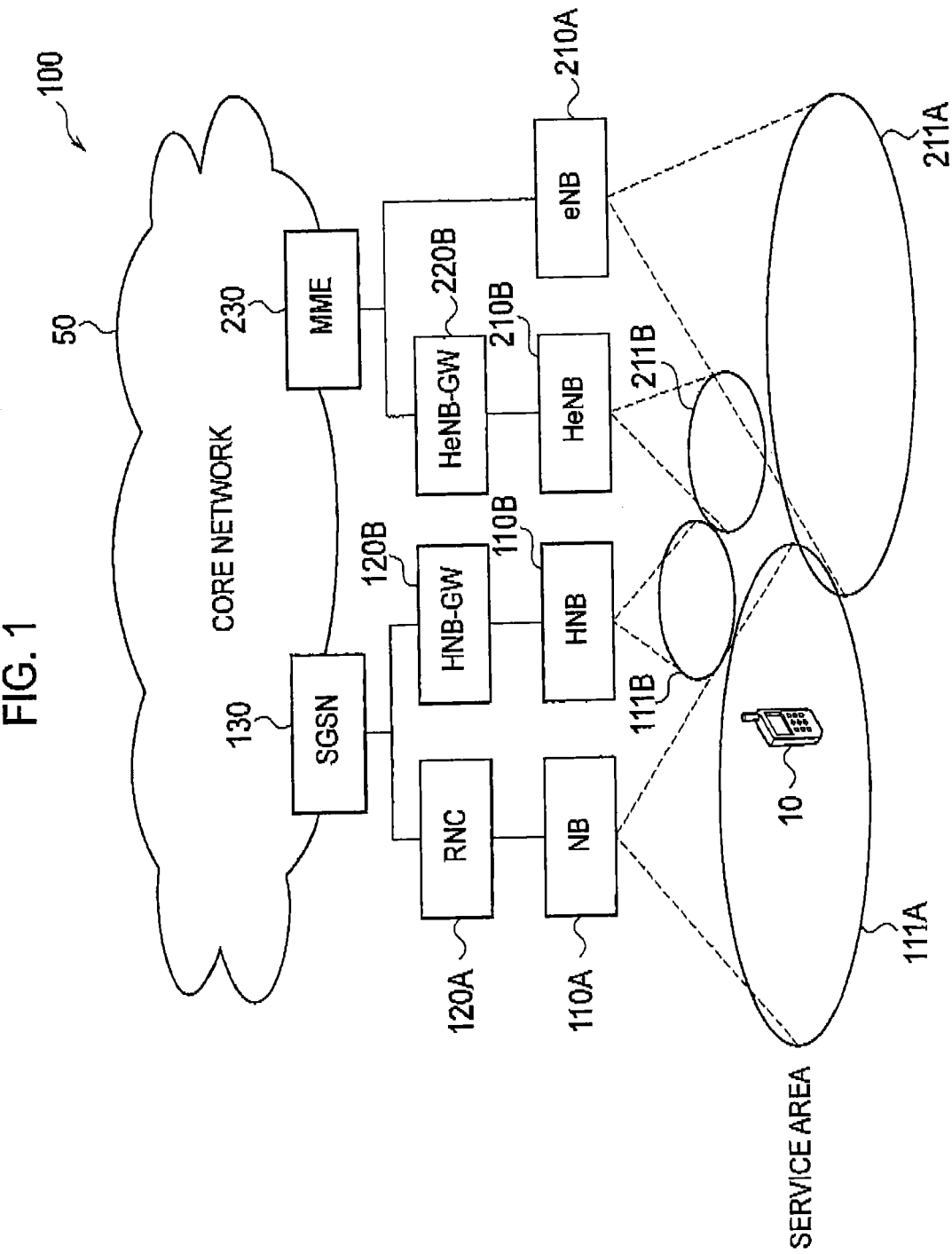
FIG. 1 is a diagram showing a mobile communication system 100 according to a first embodiment.

Hereinafter, a description will be given of a configuration of a mobile communication system according to a first embodiment with reference to the drawing. FIG. 1 is a diagram showing a mobile communication system 100 according to the first embodiment.

As shown in FIG. 1, the mobile communication system 100 includes a communication terminal device 10 (hereinafter, UE 10) and a core network 50. In addition, the mobile communication system 100 includes a first communication system and a second communication system.

The first communication system is a communication system supporting UMTS (Universal Mobile Telecommunication System), for example. The first communication system includes a base station 110A (hereinafter, NB 110A), a home base station 110B (hereinafter, HNB 110B), an RNC 120A, a home base station gateway 120B (hereinafter, HNB-GW 120B) and an SGSN 130.

A radio access network (UTRAN; Universal Terrestrial Radio Access Network) corresponding to the first communication system includes the NB 110A, the HNB 110B, the RNC 120A, and the HNB-GW 120B.

The second communication system is a communication system corresponding to an LTE (Long Term Evolution) for example. For example, the second communication system includes a base station 210A (hereinafter, eNB 210A), a home base station 210B (hereinafter, HeNB 210B), a home base station gateway 220B (hereinafter, HeNB-GW 220B), and an MME 230.

A radio access network (E-UTRAN; Evolved Universal Terrestrial Radio Access Network) corresponding to the second communication system includes the eNB 210A, the HeNB 210B, and the HeNB-GW 220B.

The UE 10 is a device (User Equipment) configured to communicate with the first communication system or the second communication system. For example, the UE 10 has a function of performing radio communications with the NB 110A and the HNB 110B. Alternatively, the UE 10 has a function of performing radio communications with the eNB 210A and the HeNB 210B.

The NB 110A has a macrocell 111A and is a device (Node B) configured to perform radio communications with a UE 10 present in the macrocell 111A.

The macrocell 111A is configured to use a carrier line (line which belongs the carrier/operator), for example. The carrier line is a line owned by a communication carrier installed the NB 110A, which manages the macrocell 111A, or a line contracted by the communication carrier.

The HNB 110B has a specific cell 111 and is a device (Home Node B) configured to perform radio communications with a UE present in the specific cell 111B.

The specific cell 111B is configured to use a user line, for example. The user line is a line contracted by the user, for him/herself, who installed the HNB 110B, which manages the specific cell 111B. The user line includes a line between a radio control device (RNC 120A) provided by a carrier and the HNB 110B, a line between a gateway device (HNB-GW 120B) provided by a carrier and the HNB 110B, a line between a core network device (SGSN 130) provided by a carrier and the HNB 110B, or one or some of these lines. The user line is an ADSL line, an optical line or the like, for example.

The RNC 120A is connected to the NB 110A and is a device (Radio Network Controller) that establishes a radio connection (RRC Connection) with the UE 10 in the macrocell 111A.

The HNB-GW 120B is connected to the HNB 110B and is a device (Home NodeB Gateway) that establishes a radio connection (RRC Connection) with the UE 10 in the specific cell 111B.

The SGSN 130 is a device (Serving GPRS Support Node) that performs packet exchange in a packet exchange domain. The SGSN 130 is provided in the core network 50. Although not shown in FIG. 1, a device (MSC; Mobile Switching Center) that performs call switching in a call switching domain may be provided in the core network 50.

The eNB 210A has a macrocell 211A and is a device (evolved Node B) configured to perform radio communications with a UE present in the macrocell 211A.

The macrocell 211A is configured to use a carrier line, for example. The carrier line is a line owned by a communication carrier installed the eNB 210A, which manages the macrocell 211A, or a line contracted by the communication carrier.

The HeNB 210B has a specific cell 211B and is a device (Home evolved Node B) configured to perform radio communications with a UE 10 present in the specific cell 211B.

The specific cell 211B is configured to use a user line, for example. The user line is a line contracted by the user for him/herself, who installed the HeNB 210B, which manages the specific cell 211B. The user line includes a line between a radio control device (RNC 120A) provided by a carrier and the HeNB 210B, a line between a gateway device (HeNB-GW 220B) provided by a carrier and the HeNB 210B, a line between a core network device (MME 230) provided by a carrier and the HeNB 210B, and one or some of these lines. The user line is an ADSL line, an optical line or the like, for example.

The HeNB-GW 220B is connected to the HeNB 210B and is a device (Home evolved Node B Gateway) configured to manage the HeNB 210B.

The MME 230 is connected to the HeNB 210B via the HeNB-GW 220B and is a device (Mobility Management Entity) configured to manage the mobility of a UE 10 that establishes a radio connection with the HeNB 210B.

The macrocell and the specific cell should be understood as functions to perform radio communications with the UE 10. However, it should be noted that the macrocell and the specific cell are also used as terms indicating service areas of a cell. Cells such as the macrocell and the specific cell are identified by a frequency, a spread code, a timeslot, or the like used therein.

In some cases, the specific cell is referred to as a femtocell, a CSG (Closed Subscriber Group), and a home cell. The specific cell is configured such that an access type is settable. The access type specifies a UE 10 allowed to access the specific cell, and is set at "Closed," "Hybrid," or "Open."

A "Closed" specific cell is configured to allow only a specific user managed by the specific cell to be provided with services.

A "Hybrid" specific cell is configured to allow, for example, the specific user managed by the specific cell to perform communications with a high quality and the non-specific user not managed by the specific cell to perform communications with best effort quality.

An "Open" specific cell is configured to allow all the UEs 10 to be provided with a service, as in a macrocell. In the "Open" cell, communication qualities among the UEs 10 are not differentiated irrespective of whether the UE 10 is managed by the specific cell or not.

The access type may also be "ACCESS CLASS BARRED" that prohibits an access of the UE 10 for each access class, or a "CELL BARRED" that prohibits the access of the UE 10 for each cell.

(Configuration of Network Device)

Figures 2, 3:
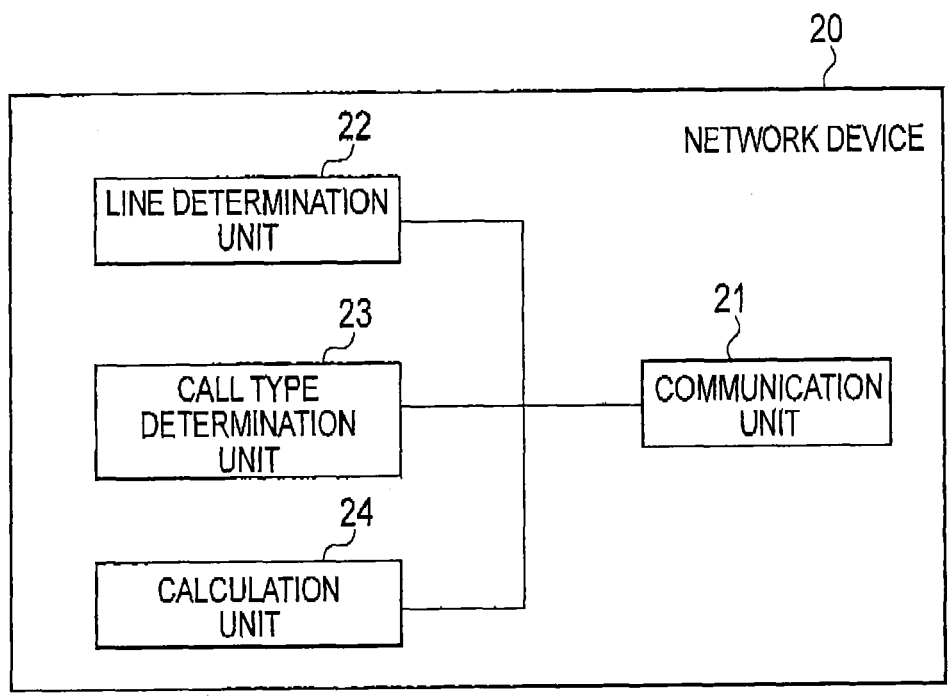
FIG. 2 is a diagram showing a network device 20 according to the first embodiment.
FIG. 3 is a diagram showing an example of a line identifier according to the first embodiment.

Next, a description will be given of a configuration of a network device according to the first embodiment with reference to the drawings. FIG. 2 is a diagram showing a network device 20 according to the first embodiment. As shown in FIG. 2, the network device 20 includes a communication unit 21, a line determination unit 22, a call type determination unit 23 and a calculation unit 24.

Note that, the network device 20 may be a device configured to manage the specific cell (the HNB 110B or HeNB 210B, for example). Alternatively, the network device 20 may be a device provided at an upper level of the device managing the specific cell (the RNC 120A, HNB-GW 120B, SGSN 130, HeNB-GW 220B or MME 230, for example). Alternatively, the network device 20 may be another device (a charging server, for example) provided in the core network 50.

The communication unit 21 performs communications with the UE 10. Alternatively, the communication unit 21 performs communications with another network device.

The communication unit 21 notifies a user installed a radio base station managing the specific cell of a reduction fee calculated by the calculation unit 24 to be described later, for example.

The line determination unit 22 determines whether or not a communication call set in communications performed by the UE uses a user line. The communication call is a voice call, a packet call, an originating call, a terminating call or the like, for example.

Specifically, firstly, if the UE 10 performs communications with the specific cell, the line determination unit 22 acquires a line identifier configured to identify a user installed a radio base station managing the specific cell. Here, if the line determination unit 22 has a correspondence relation between the identifier of the radio base station managing the specific cell and the user installed the radio base station, the line identifier may be an identifier of the radio base station managing the specific cell.

Note that, the line identifier may be configured to identify a radio base station managing a macrocell and may be configured to identify a communication carrier installed the radio base station managing the macrocell.

If the network device 20 is a radio control device (the HNB-GW 120B, RNC 120A, HeNB 210B or the like), for example, the line determination unit 22 extracts a line identifier from a radio link setting response (Radio Link Response).

Note that, the line identifier has the configuration shown in FIG. 3, for example. As shown in FIG. 3, the line identifier is configured of "Access Charge Bit," "Line Type," "User Line Rate" and "CSG ID."

"Access Charge Bit" is an information element indicating whether the radio base station uses a user line or a carrier line. The length of "Access Charge Bit" is 1 bit, for example.

"Line Type" is an information element indicating the type of a user line if the radio base station uses a user line. "Line Type" shows a line type such as "ADSL line" or "optical line." The length of "Line Type" is 3 bits, for example.

"User Line Rate" is an information element indicating the proportion that a user line occupies in the entire line or with respect to a carrier line if the radio base station uses a user line. The length of "User Line Rate" is 7 bits, for example.

"CSG ID" is an information element identifying a radio base station managing the specific cell if the radio base station uses a user line. Specifically, "CSG ID" is an information element identifying a user installed the radio base station managing the specific cell. The length of "CSG ID" is 27 bits, for example.

Note that, the network device 20 preferably manages information associating the user installed the radio base Station managing the specific cell with "CSG ID." Alternatively, the network device 20 may acquire the information associating the user installed the radio base station managing the specific cell with "CSG ID" from another device.

Secondly, the line determination unit 22 determines on the basis of the line identifier whether or not the communication call uses the user line. Specifically, the line determination unit 22 determines that the communication call uses the user line, if it is identified by the line identifier that the communication call uses the user line.

Note that, if the line identifier is configured to identify a communication carrier installed a radio base station managing a macrocell, the line determination unit 22 may determine on the basis of the line identifier whether or not the communication call uses the carrier line. Specifically, the line determination unit 22 determines that the communication call uses the user line, if it is identified by the line identifier that the communication call uses the carrier line.

The call type determination unit 23 determines the type of the communication call set in the communications performed by the UE 10. Specifically, the call type determination unit 23 determines whether or not the type of the communication call using the user line or the connection method of the communication call using the user line is a reduction target. The type of the reduction target may be any one or more communication calls among a voice call, a packet call and the like. In addition, the type of the reduction target may be the connection method of a communication call, such as an individual channel connection including an originating call, terminating call, emergency call, normal call, HSPA and the like or a common channel connection including HSPA and the like.

The reduction target may be optionally determined by the communication carrier or the like.

If the communication call uses a user line, the calculation unit 24 calculates a reduction fee to be discounted for the user installed the radio base station managing the specific cell. To put it differently, if the type of the communication call using the user line or the connection method of the communication call using the user line is the reduction target, the calculation unit 24 calculates a reduction fee to be discounted for the user installed the radio base station managing the specific cell. More specifically, the calculation unit 24 calculates a reduction fee to be discounted from a usage fee for the communication call using the user line for the user installed the radio base station managing the specific cell.

The reduction fee calculated by the calculation unit 24 may be expressed by a ratio between the usage and the reduction fee (reduction rate). Alternatively, the reduction fee calculated by the calculation unit 24 may be an absolute amount of the value to be discounted for the user.

Specifically, in the case where the line identifier is configured to identify only the user line, the calculation unit 24 calculates a reduction fee to be discounted for the user on the basis of the time during which the user line is occupied. Alternatively, the calculation unit 24 calculates a reduction fee to be discounted for the user on the basis of the communication amount (packet amount) used in the user line.

Alternatively, in the case where the line identifier is configured to identify both of the user line and the carrier line, the calculation unit 24 calculates a reduction fee to be discounted for the user on the basis of the ratio between the time during which the user line is occupied and the time during which the carrier line is occupied. Alternatively, the calculation unit 24 calculates a reduction fee to be discounted for the user on the basis of the ratio between the communication amount (packet amount) used in the user line and the communication amount (packet amount) used in the carrier line.

Here, the usage fee for the communication call is collected from the subscriber of the UE 10 through the communication carrier in general. If the user installed the radio base station managing the specific cell is the subscriber of the UE 10, the reduction fee calculated by the calculation unit 24 is reduced for the subscriber of the UE 10. Note that, the user installed the radio base station managing the specific cell may be different from the subscriber of the UE 10.

(Configuration of Communication Terminal Device)

Figure 4:
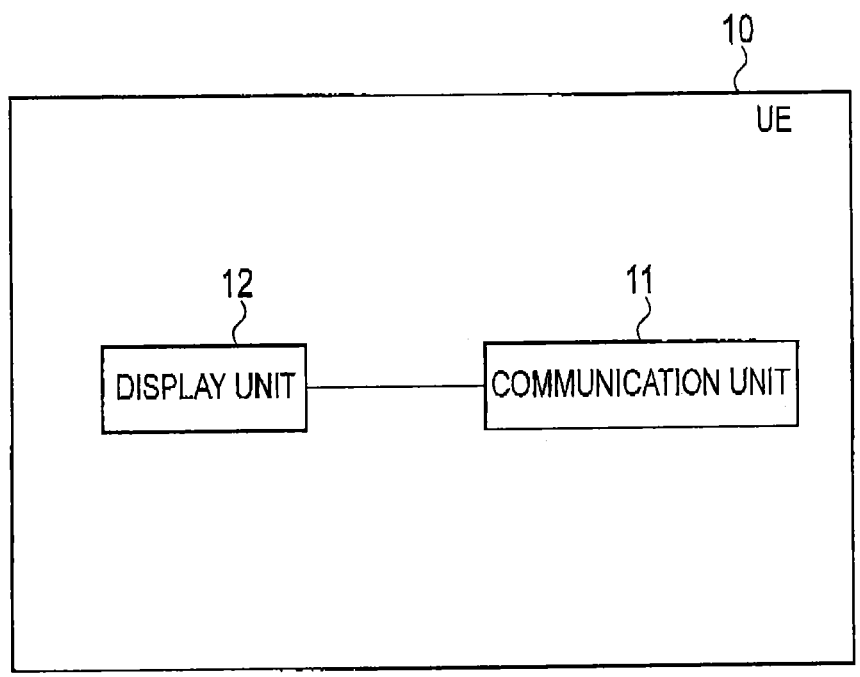
FIG. 4 is a diagram showing a UE 10 according to the first embodiment.

Hereinafter, a description will be given of a configuration of the communication terminal device according to the first embodiment with reference to the drawing. FIG. 4 is a diagram showing the UE 10 according to the first embodiment. As shown in FIG. 4, the UE 10 includes a communication unit 11 and a display unit 12. Note that, an example of the case where the subscriber of the UE 10 is the user installed the radio base station managing the specific cell will be described. Specifically, an example of the case where the reduction fee is reduced for the subscriber of the UE 10 will be described.

The communication unit 11 performs radio communications with the NB 110A and the HNB 110B. In addition, the communication unit 11 performs radio communications with the eNB 210A and the HeNB 210B. Moreover, the communication unit 11 performs communications with the network device 20.

The display unit 12 displays various types of information. The display unit 12 displays a reduction fee, for example. Here, the display unit 12 may display a history of reduction fees during a certain period or may display an accumulated amount of reduction fees during a certain period.

Note that, the network device 20 preferably notifies the UE 10 of the reduction fee. The reduction fee may be notified to the UE 10 at the end of a communication call or may be notified to the UE 10 upon request from the UE 10.

(Operation of Mobile Communication System)

Figure 5:
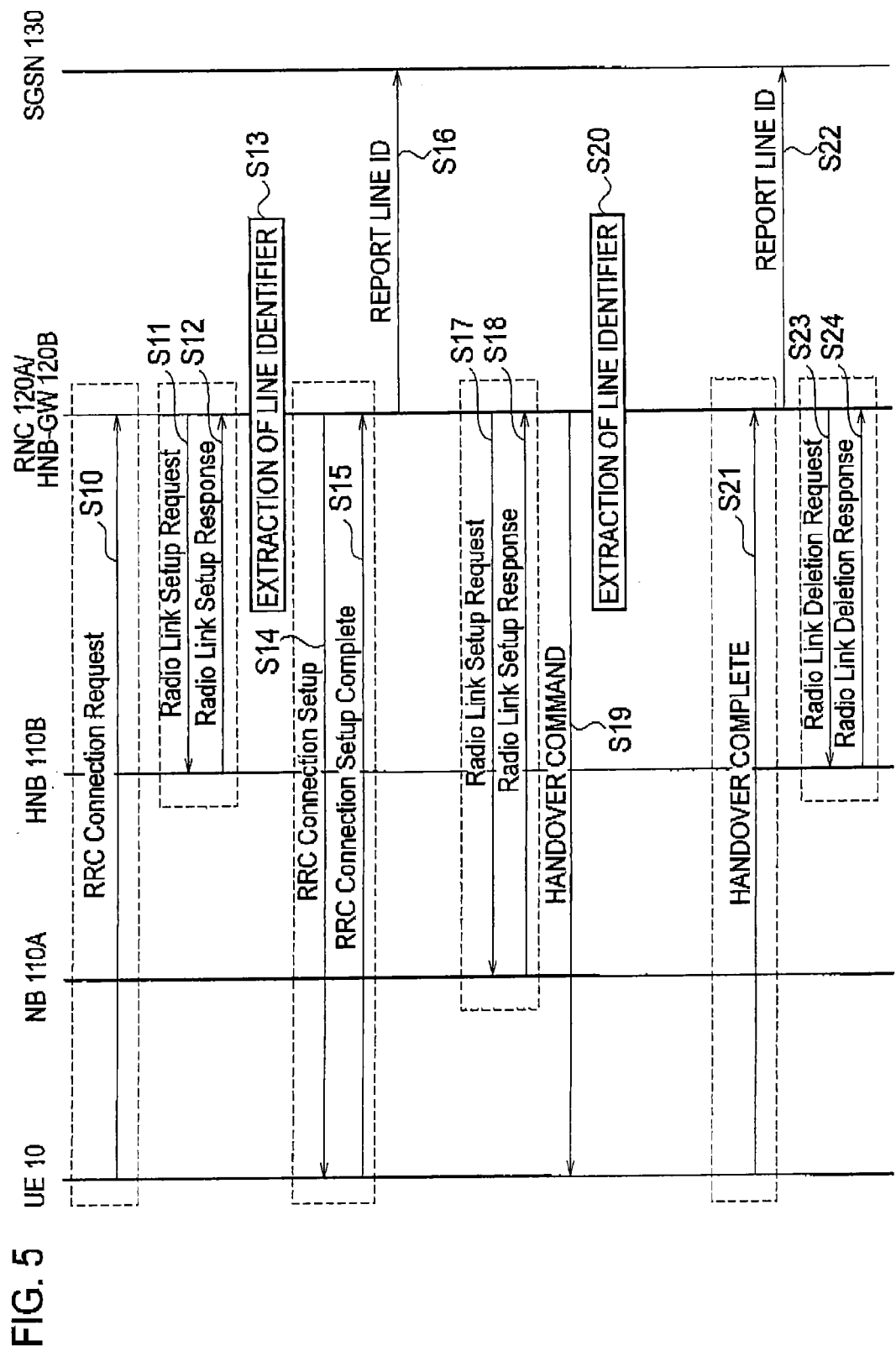
FIG. 5 is a sequence diagram showing operation of the mobile communication system 100 according to the first embodiment.

Hereinafter, a description will be given of operation of the mobile communication system according to the first embodiment with reference to the drawing. FIG. 5 is a sequence diagram showing the operation of the mobile communication system 100 according to the first embodiment.

Here, a description will be given of an example of a case where the UE 10 starts communications with the HNB 110B (specific cell 111B) and performs communications with the NB 110A (macrocell 111A) after going through a soft handover state between the NB 110A (macrocell 111A) and the HNB 110B (specific cell 111B).

As shown in FIG. 5, the UE 10 transmits a radio connection request (RRC Connection Request) between the UE 10 and the HNB-GW 120B to the HNB-GW 120B in step 10.

In step 11, the HNB-GW 120B transmits a radio link setup request (Radio Link Setup Request) between the UE 10 and the HNB 110B (specific dell 111B) to the HNB 110B (specific cell 111B).

In step 12, the HNB 110B (specific cell 111B) transmits a radio link setup response (Radio Link Setup Response) between the UE 10 and the HNB 110B (specific cell 111B) to the HNB-GW 120B.

Here, the HNB 110B (specific cell 111B) includes in the setup response a line identifier configured to identify the HNB 110B (or the user installed the HNB 110B), which manages the specific cell 111B.

In step 13, the HNB-GW 120B extracts the line identifier from the setup response received in step 12. Alternatively, the HNB-GW 120B identifies the user installed the HNB 110B, on the basis of the line identifier.

In step 14, the HNB-GW 120B transmits a radio connection setup instruction (RRC Connection Setup) between the UE 10 and the HNB-GW 120B to the UE 10.

In step 15, the UE 10 transmits a radio link connection setup completion (RRC Connection Setup Complete) between the UE 10 and the HNB-GW 120B to the HNB-GW 120B.

In step 16, the HNB-GW 120B reports the line identifier extracted in step 13 to the SGSN 130. Alternatively, the HNB-GW 120B reports the user identified in step 13 to the SGSN 130.

In step 17, the HNB-GW 120B transmits a radio link setup request (Radio Link Setup Request) between the UE 10 and the NB 110A (macrocell 111A) to the NB 110A (macrocell 111A) via the RNC 120A.

In step 18, the NB 110A (macrocell 111A) transmits a radio link setup response (Radio Link Setup Response) between the UE and the NB 110A (macrocell 111A) to the HNB-GW 120B via the RNC 120A.

Here, the NB 110A (macrocell 111A) includes in the setup response a line identifier configured to identify the NB 110A (or the communication carrier installed the NB 110A), which manages the macrocell 111A.

In step 19, the HNB-GW 120B transmits a command (HANDOVER COMMAND) indicating start of soft handover between the NB 110A (macrocell 111A) and the HNB 110B (specific cell 111B) to the UE 10.

In step 20, the HNB-GW 120B extracts the line identifier from the setup response received in step 18. Alternatively, the HNB-GW 120B identifies the communication carrier installed the NB 110A, on the basis of the line identifier.

In step 21, the UE 10 transmits a command (HANDOVER COMPLETE) indicating completion of the soft handover between the NB 110A (macrocell 111A) and the HNB 110B (specific cell 111B) to HNB-GW 120B.

In step 22, the HNB-GW 120B reports the line identifier extracted in step 20 to the SGSN 130. Alternatively, the HNB-GW 120B reports the communication carrier identified in step 20 to the SGSN 130.

In step 23, the HNB-GW 120B transmits a radio link deletion request (Radio Link Deletion Request) to the HNB 110B (specific cell 111B).

In step 24, the HNB 110B (specific cell 111B) transmits a radio link deletion response (Radio Link Deletion Response) to the HNB-GW 120B.

Note that, the connection procedure may be a handover procedure or a reconnection procedure or a cell updating procedure such as a common channel transition procedure (CELL UPDATE). Moreover, the connection procedure may be an Inter-RAT procedure including as an originating call, a terminating call, CSFB (Circuit Switching Fallback) and the like in the HNB 110B.

(Operational Effects)

In the embodiment, the line identifier is configured to identify the user installed the radio base station managing the specific cell, and the line determination unit 22 determines by using the line identifier whether or not the communication call uses the user line.

To put it differently, the user installed the radio base station managing the specific cell can be identified by the line identifier. This enables provision of a service to discount at least a part of a usage fee for the communication call using the user line.

In the embodiment, the call type determination unit 23 determines whether or not the type of the communication call using the user line or the connection method of the communication call using the user line is a reduction target. To put it in another way, it is possible for the communication carrier or the like to set a reduction target. Thus, a variety of services can be provided as a usage fee reduction service.

As described above, the provision of a usage fee reduction service makes it possible to give the user installed the radio base station managing the specific cell an incentive to cause other UEs 10 not managed by the specific cell to use the specific cell. Specifically, an increase in the specific cells for which "Hybrid" or "Open" is set as the access type can be expected. Thus, it is possible to achieve promotion of utilization of the specific cell.

MODIFICATION EXAMPLE 1

Hereinafter, a description will be given of Modification Example 1 of the first embodiment with reference to the drawing. A difference from the first embodiment will be mainly described below.

Figure 6:
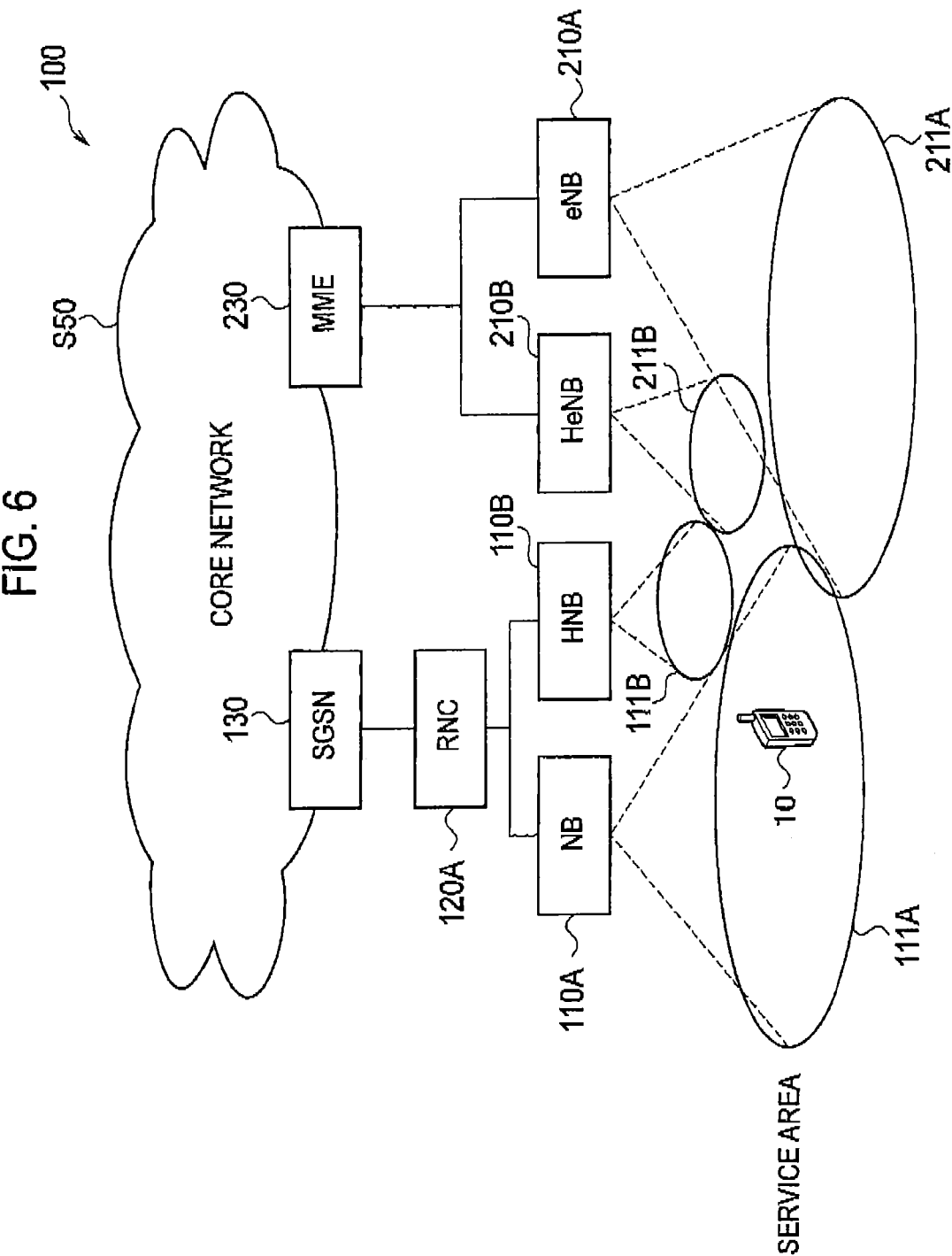
FIG. 6 is a diagram showing a mobile communication system 100 according to Modification Example 1.

Specifically, the upper level node of the HNB 110B is the HNB-GW 120B in the first embodiment. Meanwhile, as shown in FIG. 6, the upper level node of the HNB 110B is the RNC 120A in Modification Example 1.

In Modification Example 1, the RNC 120A manages the HNB 110B instead of the HNB-GW 120B. To put it differently, the RNC 120A provides the same functions as those of the HNB-GW 120B to a device that belongs under the RNC 120A.

Moreover, the upper level node of the HeNB 210B is the HeNB-GW 220B in the first embodiment. Meanwhile, as shown in FIG. 6, the upper level node of the HeNB 210B is the MME 230 in Modification Example 1.

In Modification Example 1, the HeNB 210B provides the same functions as those of the HeNB-GW 220B to a device that belongs under the HeNB 210B, instead of the HeNB-GW 220B.

Note that, it is possible to omit only the HNB-GW 120B, or to omit only the HeNB-GW 220B.

[Other Embodiments]

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

In the sequence shown in FIG. 5 described above, an example of the case where the cell used by the UE 10 is changed in the first communication system is described. However, the embodiment is not limited to this case. The embodiment may be applied to a case where the cell used by the UE 10 is changed in the second communication system, for example. Alternatively, the embodiment may be applied to a case where the cell used by the UE 10 is changed between the first communication system and the second communication system.

In the above-described embodiment, a case is described in which the structure (the communication unit 21, the line determination unit 22, the call type determination unit 23, the calculation unit 24) provided in the network device 20 are provided in a single device. The embodiment is not limited to this. Specifically, the communication unit 21, the line determination unit 22, the call type determination unit 23 and the calculation unit 24 may be respectively provided in different devices.

For example, the line determination unit 22 or the call type determination unit 23 may be provided to the NB 110A, the HNB 110B, the eNB 210A, the HeNB 210B, or the like. The line determination unit 22 or the call type determination unit 23 may be provided to the RNC 120A, the HNB-GW 120B, the eNB 210A, the HeNB 210B, the HeNB-GW 220B, or the like. The line determination unit 22 or the call type determination unit 23 may be provided to the SGSN 130 or the MME 230. The calculation unit 24 may be provided to the SGSN 130 or the MME 230 and may be provided to a server (a charging server, for example) provided in the core network 50.

Alternatively, the calculation unit 24 may be provided to the RNC 120A, the HNB-GW 120B, the eNB 210A, the HeNB 210B or the HeNB-GW 220B. In this case, if the line determination unit 22 and the call type determination unit 23 are provided to a switching device such as the SGSN 130 or the MME 230, the switching device notifies by using an information element such as SPID (Subscriber Profile Identity) the device having the calculation unit 24 that the communication call is a reduction target call.

For communications among the devices, a control signal is used that includes RANAP (Radio Access Network Application Part), NBAP (NodeB Application part), RNSAP (Radio Network Subsystem Application), and HNBAP (Home NodeB Application Part).

The above-described operations of the UE 10 may be implemented by hardware, a software module executed by a processor, or a combination of both.

The software module may be provided in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk drive, a removable disk, or a CD-ROM.

The storage medium is connected to the processor so that the processor can read and write information from and to the storage medium. Also, the storage medium may be integrated into the processor. Additionally, the storage medium and the processor may be provided in an ASIC. The ASIC may be provided in the UE 10. Moreover, the storage medium and the processor may be provided in the UE 10 as a discrete component.

Note that, the entire content of Japanese Patent Application No. 2009-289779 (filed on Dec. 21, 2009) is incorporated herein by reference.

INDUSTRIAL APPLICABILITY

According to the present invention, it is possible to provide a mobile communication system, a network device and a mobile communication method each of which makes it possible to provide a service to discount at least a part of a usage fee for a communication call using a user line. Thus, the mobile communication system, the network device and the mobile communication method are useful in radio communications and the like.

EXPLANATION OF REFERENCE NUMERALS

10 . . . communication terminal device, 11 . . . communication unit, 12 . . . display unit, 20 . . . network device, 21 . . . communication unit, 22 . . . line determination unit, 23 . . . call type determination unit, 24 . . . calculation unit, 50 . . . core network, 100 . . . mobile communication system, 110A . . . NB, 110B . . . HNB, 111A . . . macrocell, 111B . . . specific cell, 120A . . . RNC, 120B . . . HNB-GW, 130 . . . SGSN, 210A . . . eNB, 2108 . . . HeNB, 211 . . . macrocell, 211B . . . specific cell, 220B . . . HeNB-GW, 230 . . . MME

The invention claimed is

1. A mobile communication system having a specific cell configured to use a user line which is a wired line connecting the specific cell to a wireless carrier, and to use a carrier line that is separate from the user line, the system comprising:
a line determination unit configured to determine whether or not a communication call uses the user line, by using a line identifier configured to identify a user-installed radio base station managing the specific cell, the radio base station being connected to the user line, the line identifier including information identifying a type of the user line, information identifying a ratio of a number of packets sent and received using the user line to a number of packets sent and received using the carrier line, and a base station identifier for the user-installed base station;
a calculation unit configured to calculate a reduction fee to be discounted from a usage fee for the communication call using the user line connected to the user-installed radio base station managing the specific cell;
a call type determination unit configured to determine whether or not a type of the communication call using the user line or a connection method of the communication call using the user line is a reduction target; and
a notification unit configured to notify the user-installed radio base station of the reduction fee to be discounted, wherein
the calculation unit calculates a reduction fee to be discounted from a usage fee for the communication call using the user line connected to the user-installed radio base station managing the specific cell, if the type of the communication call using the user line or the connection method of the communication call using the user line is a reduction target, and
the calculation unit calculates the reduction fee using the ratio of a number of packets sent and received using the user line to a number of packets sent and received using the carrier line that is included in the line identifier.

2. A network device provided in a mobile communication system having a specific cell configured to use a user line which is a wired line connecting the specific cell to a wireless carrier, the mobile communication system also including a carrier line that is separate from the user line, the device comprising:
a line determination unit configured to determine by using a line identifier whether or not a communication call uses the user line, the line identifier configured to identify a user-installed radio base station managing the specific cell, the radio base station being connected to the user line, the line identifier including information identifying a type of the user line, information identifying a ratio of a number of packets sent and received using the user line to a number of packets sent and received using the carrier line, and a base station identifier for the user-installed base station;
a calculation unit configured to calculate a reduction fee to be discounted from a usage fee for the communication call using the user line connected to the user-installed radio base station managing the specific cell;
a call type determination unit configured to determine whether or not a type of the communication call using the user line or a connection method of the communication call using the user line is a reduction target; and
a notification unit configured to notify the user-installed radio base station of the reduction fee to be discounted, wherein
the calculation unit calculates a reduction fee to be discounted from a usage fee for the communication call using the user line connected to the user-installed radio base station managing the specific cell, if the type of the communication call using the user line or the connection method of the communication call using the user line is a reduction target, and
the calculation unit calculates the reduction fee using the ratio of a number of packets sent and received using the user line to a number of packets sent and received using the carrier line that is included in the line identifier.

3. A mobile communication method applied to a mobile communication system having a specific cell configured to use a user line which is a wired line connecting the specific cell to a wireless carrier, and to use a carrier line that is separate from the user line, the method comprising:
determining whether or not a communication call uses the user line, by using a line identifier configured to identify a user-installed radio base station managing the specific cell, the radio base station being connected to the user line, the line identifier including information identifying a type of the user line, information identifying a ratio of a number of packets sent and received using the user line to a number of packets sent and received using the carrier line, and a base station identifier for the user-installed base station;
calculating a reduction fee to be discounted from a usage fee for the communication call using the user line connected to the user-installed radio base station managing the specific cell;

determining whether or not call type of the communication call using the user line or a connection method of the communication call using the user line is a reduction target; and communicating the reduction fee to the user-installed radio base station when the communication call is a reduction target, wherein a reduction fee to be discounted from a usage fee for the communication call using the user line connected to the user-installed radio base station managing the specific cell is calculated if the type of the communication call using the user line or the connection method of the communication call using the user line is a reduction target, the reduction fee being calculated using the ratio of a number of packets sent and received using the user line to a number of packets sent and received using the carrier line that is included in the line identifier.

4. The mobile communication system according to claim 1, wherein the user line is an ADSL line.

5. The mobile communication system according to claim 1, wherein the carrier line corresponds to a cellular network.

* * * * *